| United States Patent [19] | [11] Patent Number: 4,911,974 |
| Shimizu et al. | [45] Date of Patent: Mar. 27, 1990 |

[54] TACK-FREE SILICONE GEL MOLDINGS

[75] Inventors: Koji Shimizu; Mitsuo Hamada, both of Chiba, Japan

[73] Assignee: Toray Silicone Company, Ltd., Tokyo, Japan

[21] Appl. No.: 215,133

[22] Filed: Jul. 5, 1988

[30] Foreign Application Priority Data

Jul. 7, 1987 [JP] Japan .................. 62-168962

[51] Int. Cl.$^4$ .................. B32B 25/20; B32B 5/16
[52] U.S. Cl. .................. 428/143; 428/144; 428/145; 428/206; 428/220; 428/331; 428/405; 428/407; 428/447; 428/327
[58] Field of Search .............. 428/143, 331, 327, 405, 428/407, 447, 144, 145, 206, 220; 2/159, 168; 623/7

[56] References Cited

U.S. PATENT DOCUMENTS

| 1,985,002 | 12/1934 | Frank et al. .................. 427/180 |
| 2,895,939 | 3/1957 | Stober et al. .................. 427/180 |
| 3,687,699 | 8/1972 | Prosser et al. .................. 427/186 |
| 3,714,204 | 1/1973 | Lamont .................. 260/37 SB |
| 3,728,739 | 4/1973 | Semp .................. 2/168 |
| 3,761,965 | 10/1973 | Barasch .................. 2/167 |
| 4,019,209 | 4/1977 | Spence .................. 3/36 |
| 4,061,709 | 12/1977 | Miller et al. .................. 264/293 |
| 4,064,564 | 11/1977 | Casey .................. 2/168 |
| 4,070,713 | 1/1978 | Stockum .................. 2/168 |
| 4,143,423 | 3/1979 | Sterlieb .................. 2/168 |
| 4,163,082 | 7/1979 | Romenesko .................. 428/447 |
| 4,540,407 | 9/1985 | Dunn .................. 604/292 |
| 4,551,362 | 11/1985 | Harms et al. .................. 427/180 |
| 4,623,589 | 11/1986 | Simmonds, Jr. .................. 428/403 |
| 4,668,224 | 5/1987 | Lentz et al. .................. 604/265 |
| 4,742,142 | 3/1988 | Shimizu et al. .................. 528/15 |

FOREIGN PATENT DOCUMENTS

| 0293902 | 10/1968 | Austria . |
| 1943876 | 5/1970 | Fed. Rep. of Germany . |
| 30932 | 2/1984 | Japan . |
| 51035 | 3/1986 | Japan . |
| 2129820 | 10/1983 | United Kingdom . |

OTHER PUBLICATIONS

"Compounding Ingredients for Rubber", edited by the editors of Rubber World (The Cueno Press of New England, 1961), pp. 373, 374, 377 and 378.

*Primary Examiner*—Henry F. Epstein
*Assistant Examiner*—Archene A. Turner
*Attorney, Agent, or Firm*—Susan M. Cornwall; Allan O. Maki

[57] ABSTRACT

Tack-free silicone gel moldings and methods of making such moldings are prepared by coating tacky silicone gel moldings with a silicone rubber particles, having an average diameter less than about 1 mm.

2 Claims, No Drawings

TACK-FREE SILICONE GEL MOLDINGS

BACKGROUND OF THE INVENTION

1. Field of the Invention

The present invention relates to tack-free silicone gel moldings.

Silicone gels have an excellent heat resistance, cold resistance, vibration resistance, shock-absorption capacity, etc., and they have found use in various applications, for example, as shock-absorbing materials, because of these properties. Unfortunately, silicone gels are initially tacky, which imposes numerous limitations, for example, a silicone gel will adhere to other materials and to itself when used as a molding. Accordingly, it would be desirable to develop a silicone gel molding in which the surfaces of the silicone gel are tack-free.

As a method for solving this problem, it has been proposed that the surface of the already prepared silicone gel molding be treated with a curing agent for silicone gels in order to form a cured silicone rubber covering layer at the surface of the silicone gel molding (refer to Japanese Patent Application Laid Open No. 61-51035 and Japanese Patent Publication No. 59-30932).

However, such surfaces still exhibit a not inconsiderable stickiness, causing them to be less than entirely satisfactory as tack-free silicone gel moldings.

The present inventors achieved the present invention as a consequence of extensive research with a view to solving the problem under consideration.

SUMMARY OF THE INVENTION

The object of the present invention is to provide a silicone gel molding which not only retains the shape of the silicone gel molding, but which also has a tack-free surface.

That is, the present invention relates to tack-free silicone gel moldings having the characteristic that the surface of a tacky silicone gel molding is coated with a particulate having an average diameter not larger than 1 mm comprising silicone rubber particles.

DETAILED DESCRIPTION OF THE INVENTION

To explain the preceding, silicone gel in the sense of the present invention is a silicone which consists principally of organopolysiloxane, with the latter being cross-linked to give a partial three-dimensional network structure. As a result, deformation and limited fluidity appear upon the application of stress. It generally has a hardness not greater than 50 as obtained on an ASKER C® Hardness Tester, a spring-type hardness tester, available from Kobunshi Keiki Corporation, Japan, for measuring hardness of plastic erasers according to Japanese Industrial Standard (JIS) S 6050-1983. Also, the silicone gel generally has a hardness not greater than zero as measured on a spring-type hardness tester for measuring the hardness of vulcanized rubbers according to Japanese Industrial Standard (JIS) K 6301-1975. Silicone gel moldings within the scope of the present invention encompass any moldings of a silicone gel as described above, and the shape and size are not specifically restricted. For example, sheets, blocks, spheres, and irregular shapes are included in this regard. When the tack-free silicone gel moldings of the present invention are used as shock-absorbing materials or as organic resin-modifying additives, spheres having average diameters in the range of 0.1 to 20 mm are preferred.

The particulate used in the present invention functions to render the surface of the silicone gel molding tack-free while at the same time maintaining the molding's shape. The average diameter of the particulate must not exceed 1 mm, and of course must be smaller than the average diameter of the silicone gel molding. When this average diameter exceeds 1 mm, the surface of the silicone gel molding will be rough, and the particulate is easily shed from the silicone gel molding.

The particulate encompasses silicone rubber particles, silicone resin particles, inorganic particles, and organic resin particles, and silicone rubber particles are preferred among these based on the obtained permanence and absence of tack.

With regard to particulate silicone rubber which comprises one type of suitable particulates, this is a particulate composed of silicone rubber and has an average diameter not larger than 1 mm, but preferably 0.1 to 1,000 micrometers, and particularly preferably 0.1 to 20 micrometers. No specific limitation applies to the silicone rubber constituting the silicone rubber particles, and it may be, for example, a condensation-cured silicone rubber as generated by a dehydrocondensation reaction, in the presence of a condensation-reaction catalyst, between a hydroxyl-terminated diorganopolysiloxane and an organohydrogenpolysiloxane having at least 3 silicon-bonded hydrogen atoms in each molecule; an addition-cured silicone rubber as generated by an addition reaction, in the presence of a platinum catalyst, between an organopolysiloxane having at least two alkenyl groups in each molecule and an organohydrogenpolysiloxane having at least two silicon-bonded hydrogen atoms in each molecule; or a radical reaction-cured silicone rubber as generated by the radical reaction in the presence of organoperoxide of diorganopolysiloxane having vinyl groups at both molecular chain terminals and/or as side chains. The former two are preferred in the present invention for their ease of production. The silicone rubber particles can be prepared by a number of methods, and this method of production is not specifically restricted. Methods for the production of the silicone rubber particulates are specifically exemplified as follows.

(1) An addition-curing liquid silicone rubber composition (prepared from organopolysiloxane having at least two alkenyl groups, e.g., vinyl, in each molecule, organohydrogenpolysiloxane having at least two silicon-bonded hydrogen atoms in each molecule, and a platinum-type compound catalyst) is introduced into water or surfactant-containing water, and the water or surfactant-containing water is stirred in order to disperse said silicone rubber composition into microparticles and thus afford an aqueous dispersion of the liquid silicone rubber composition. The liquid silicone rubber composition is then cured by heating this aqueous dispersion. Alternatively, the liquid silicone rubber composition is cured into particle form by dispersing the aforesaid aqueous dispersion itself into water heated to at least 25 degrees Centigrade.

(2) A condensation-curing liquid silicone rubber composition (prepared from organopolysiloxane having at least 2 hydroxyl groups at the molecular-chain terminals, organohydrogenpolysiloxane having at least 3 silicon-bonded hydrogen atoms in each molecule, and an organotin catalyst) is added to water or surfactant-containing water, and the water or surfactant-containing water is stirred in order to disperse said silicone rubber composition into microparticles and thus afford an aqueous dispersion of the liquid silicone rubber composition. The liquid silicone rubber composition is then cured into titanium dioxide, mica powder, talc, glass powder, etc.; particles obtained from organic resins such as (meth)acrylic resins, polystyrene resins, polyethylene resins, polypropylene resins, fluororesins, urethane resins, etc.

The tack-free silicone gel moldings of the present invention are readily obtained by adhering a particulate as discussed above with an average diameter not exceeding 1 mm on the surface of the already molded tacky silicone gel molding. This adhesion is suitably carried out by, for example, coating, mixing, spraying, etc.

The tack-free silicone gel moldings of the present invention as explained above do not adhere to other materials or to themselves, and thus are easy to handle and are suitable for use as shock-absorbing materials and vibration-proofing agents, and as modifying additives for various organic resins and rubbers.

The present invention will be explained below using illustrative and reference examples, in which all parts and percentages are by weight.

REFERENCE EXAMPLE 1

100 Parts hydroxyl-terminated dimethylpolysiloxane having a viscosity of 80 centipoise and an hydroxyl group content of 1.5 wt% and 12 parts trimethylsiloxy-terminated methylhydrogenpolysiloxane having a viscosity of 10 centipoise and a silicon-bonded hydrogen atom content of 1.5 wt% were combined and mixed to afford a mixture A.

100 parts dimethylpolysiloxane as described above and 2 parts dibutyltin dioctoate were combined and mixed to afford a mixture B similar to the above. These mixtures A and B were placed in separate storage tanks, which were then cooled to −10 degrees Centigrade. 100 Parts of each of mixtures A and B were conveyed to a static mixer (from Tokushu Kika Kogyo Kabushiki Kaisha, 10 elements) and mixed to homogeneity. This was then sent to a colloid mill, which was also charged at the same time with 1,000 parts water and 2.5 parts of a nonionic surfactant, ethylene oxide adduct of trimethylnonanol, Tergitol TMN-6 available from Union Carbide Corporation, New York, N.Y. An aqueous dispersion of silicone rubber particles was obtained by homogenizing at 1,400 rpm with a 0.1 mm gap. When the silicone rubber particles were recovered from this aqueous dispersion and their particle size measured, an average particle diameter of 5 micrometers was found.

REFERENCE EXAMPLE 2

100 Parts dimethylvinylsiloxy-terminated dimethylpolysiloxane having a viscosity of 500 centipoise and a vinyl group content of 0.5 wt% and 6 parts trimethylsiloxy-terminated methylhydrogenpolysiloxane having a viscosity of 10 centipoise and a silicon-bonded hydrogen atom content of 1.5 wt% were combined and mixed to afford a mixture A.

100 Parts dimethylpolysiloxane as described above and 0.6 parts isopropanolic chloroplatinic acid solution (platinum content=3 wt%) were combined and mixed to afford a mixture B. These mixtures A and B were mixed in a colloid mill as in Example 1 to prepare an aqueous dispersion of a liquid silicone rubber composition. This liquid silicone rubber composition was cured by allowing the obtained aqueous dispersion to stand as such for 24 hours, thus to prepare an aqueous dispersion containing silicone rubber particles having an average particle diameter of 7 micrometers.

EXAMPLE 1

A mixture A was prepared by combining and mixing 30 parts dimethylvinylsiloxy-terminated dimethylpolysiloxane having a viscosity of 1,000 centipoise and a vinyl group content of 0.25 wt%, 70 parts dimethylvinylsiloxy-terminated dimethylsiloxane-methylvinylsiloxane copolymer having a viscosity of 1,000 centipoise and a vinyl group content of 0.5 wt%, and 1.5 parts trimethylsiloxy-terminated methylhydrogenpolysiloxane having a viscosity of 5 centipoise and a silicon-bonded hydrogen atom content of 0.8 wt%. A mixture B was prepared by combining and mixing 30 parts dimethylpolysiloxane as described above, 70 parts dimethylsiloxane-methylvinylsiloxane copolymer as described above, and 0.6 parts isopropanolic chloroplatinic acid solution having a platinum metal content of 3 wt%.

A liquid silicone gel composition was prepared by conveying these mixtures A and B to a static mixer (precooled to −10 degrees Centigrade) using pressure-delivery pumps and by mixing mixtures A and B at a 1:1 weight ratio.

100 Parts hot water and 1 part of a nonionic surfactant, ethylene oxide adduct of trimethylnonanol, Tergitol TMN-6 available from Union Cabide Corporation, New York, N.Y., were placed in a water tank equipped with a stirring paddle which would generate vortex flow at the center. These were mixed to homogeneity and the temperature was then adjusted to 80 degrees Centigrade.

The silicone gel composition prepared as above was then cured by dripping it into the hot-water tank, and the cured product consisted of sticky silicone gel spheres. The aqueous dispersion of silicone microparticles prepared in Reference Example 1 was sprayed using a sprayer onto these silicone gel spheres, followed by drying.

The external appearance and physical properties of the resulting silicone gel spheres were examined, with the following results.

External appearance
True spheres with silicone rubber microparticles adhered on the surface.
Average diameter: 1.5 mm.
Hardness of the internal layer of the spheres
5 (Asker C) and 0 (JIS A).
Surface of the spheres: smooth and not sticky.
Shedding of silicone rubber microparticles: none.
Flowability: 25 degree angle of repose.
Note: The angle of repose of the untreated silicone gel spheres could not be measured.

EXAMPLE 2

The silicone gel spheres obtained in Example 1 were immersed in the aqueous dispersion of silicone rubber microparticles prepared in Reference Example 2, recovered, and then dried in an oven at 80 degrees Centigrade to prepare silicone gel moldings whose surfaces were coated with silicone rubber microparticles. The obtained silicone gel spheres were true spheres and their surfaces were smooth and not sticky. The silicone rubber microparticles did not fall off, and the silicone gel spheres did not stick to one another.

EXAMPLE 3

100 Parts of each of mixtures A and B as described in Reference Example 2 were rapidly mixed in a mixer, and the mixture was defoamed, poured into a sheet-molding form, and then allowed to stand for 1 day to afford a tacky silicone gel sheet molding. When methylpolysilsesquioxane powder with an average particle diameter of 10 micrometers was coated on the surfaces of this silicone gel sheet molding, the surfaces became tack-free and smooth, and did not adhere to each other or to other materials. Furthermore, the methylpolysilsesquioxane powder did not fall off.

Because the tack-free silicone gel moldings of the present invention take the form of tacky silicone gel moldings whose surfaces have been coated with a particulate having an average particle diameter not larger than 1 mm and selected from the group comprising silicone rubber particles, silicone resin particles, inorganic particles, and organic resin particles, it is characteristic of such tack-free silicone gel moldings that their shape is retained while their surfaces are made tack-free at the same time.

That which is claimed is:

1. A tack-free silicone gel molding comprising a molding formed principally of a crosslinked organopolysiloxane having a partial three-dimensional network structure and exhibiting limited fluidity and deformation upon application of stress which is coated with a particulate having an average diameter less than about 1 mm, wherein said particulate comprises cured silicone rubber particles.

2. A tack-free silicone gel molding as claimed in claim 1 wherein said molding is spherical.

* * * * *